US005487616A

United States Patent [19]
Ichbiah

[11] Patent Number: 5,487,616
[45] Date of Patent: Jan. 30, 1996

[54] METHOD FOR DESIGNING AN ERGONOMIC ONE-FINGER KEYBOARD AND APPARATUS THEREFOR

[75] Inventor: Jean D. Ichbiah, 58 Lexington St., Essex, Mass. 01803

[73] Assignee: Jean D. Ichbiah, Burlington, Mass.

[21] Appl. No.: 457,042

[22] Filed: Jun. 1, 1995

[51] Int. Cl.⁶ .................................................. B41J 5/10
[52] U.S. Cl. ...................... 400/489; 235/145 R; 345/169
[58] Field of Search ................................... 400/472, 473, 400/476, 480, 486, 489; 235/145 R; 341/22, 23; 345/168, 169; 364/709.12

[56] References Cited

U.S. PATENT DOCUMENTS

| | | |
|---|---|---|
| 4,029,915 | 6/1977 | Ojima . |
| 4,211,497 | 7/1980 | Montgomery . |
| 4,579,470 | 4/1986 | Casey . |
| 4,769,516 | 9/1988 | Allen . |
| 4,823,294 | 4/1989 | Rouhani . |
| 4,971,465 | 11/1990 | Hashimoto . |
| 5,059,048 | 10/1991 | Sirkin . |
| 5,166,669 | 11/1992 | Romberg ............... 400/489 |
| 5,170,348 | 12/1992 | Hirose .................. 400/489 |
| 5,178,477 | 1/1993 | Gambaro . |
| 5,288,158 | 2/1994 | Matias .................. 345/169 |
| 5,302,970 | 4/1994 | Lakso et al. . |
| 5,332,322 | 7/1994 | Gambaro ............... 400/489 |
| 5,336,002 | 8/1994 | Russo ................... 400/489 |

*Primary Examiner*—Ren Yan
*Attorney, Agent, or Firm*—Skadden, Arps, Slate, Meagher & Flom

[57] ABSTRACT

An improved keyboard design and method for manufacturing the same is provided for minimizing the distance of travel required in entering characters using a keyboard with a single data entry device. Such system is especially useful for use in small hand held computers, pen based systems and other devices in which data entry with a pen or a single finger is required.

12 Claims, 3 Drawing Sheets

| esc | Z | V | C | H | W | K | - | <> | / | * | + |
|---|---|---|---|---|---|---|---|---|---|---|---|
| del | F | I | T | A | L | Y | , | <<< | 7 | 8 | 9 |
| tab | | | N | E | | | . | back | 4 | 5 | 6 |
| shift | G | D | O | R | S | B | ( | enter | 1 | 2 | 3 |
| cap | Q | J | U | M | P | X | ) | alt | = | 0 | % |
| ctrl | ! | ? | : | ; | ' | " | & | < > | @ | # | $ |

FIG. 1A

| esc | Z | V | C | H | W | K | - | <> | ` | ^ | ~ |
|---|---|---|---|---|---|---|---|---|---|---|---|
| del | F | I | T | A | L | Y | , | ins | Home | ↑ | PgUp |
| tab | | | N | E | | | . | back | ← | _ | → |
| shift | G | D | O | R | S | B | ( | enter | End | ↓ | PgDn |
| cap | Q | J | U | M | P | X | ) | alt | { | } | \ |
| ctrl | ! | ? | : | ; | ' | " | & | < > | [ | ] | \| |

FIG. 1B

| Z | V | C | H | W | K | - |
|---|---|---|---|---|---|---|
| 20 | 77 | 230 | 415 | 138 | 49 | |
| F | I | T | A | L | Y | , |
| 176 | 551 | 701 | 615 | 319 | 133 | 98 |
| | | N | E | | | . |
| 1741 | | 550 | 976 | 1741 | | 83 |
| G | D | O | R | S | B | ( |
| 147 | 305 | 590 | 497 | 497 | 110 | |
| Q | J | U | M | P | X | ) |
| 20 | 20 | 210 | 187 | 150 | 20 | |
| ! | ? | : | ; | ' | " | & |
| | | | | | 29 | |

FIG. 2

| Z | V | C | H | W | K |
|---|---|---|---|---|---|
| F | I | T | A | L | Y |
| | | N | E | | |
| G | D | O | R | S | B |
| Q | J | U | M | P | X |
| ! | ? | : | ; | ' | " |

METHOD FOR DESIGNING AN ERGONOMIC ONE-FINGER KEYBOARD AND APPARATUS THEREFOR

FIELD OF THE INVENTION

This invention relates generally to a keyboard for entering alphanumeric text and more particularly to a method and system for providing a keyboard that is ergonomically optimized for text entry using a single finger or electronic pen.

BACKGROUND OF THE PRESENT INVENTION

Traditional keyboards, such as the QWERTY and the DVORAK keyboards, have been designed as keyboard for typing with ten fingers. Typically, proficient typists will orient their fingers on the so-called "home" keys (on the QWERTY keyboard, the keys "asdf" for the left hand and "jkl;" for the right hand) and typing letters will either be on this home row or involve a move to some adjacent keys, one row below the home row, or one or two rows above. Consequently, there is little significant finger travel and the typist maintains an orientation on the "home" keys.

U.S. Pat. Nos. 5,352,050, 4,244,659, 4,655,621, 3,970,185, 2,080,457, and 2,040,248, optimize the layouts of ten-finger keyboards based on the frequency of usage of the letters in a target language. These patents, however, are optimized for the use of ten-finger keyboards and do not result in any significant reduction of travel for a single finger or electronic pen user. Other keyboards, such as U.S. Pat. No. 5,336,002, have been optimized for use with multiple fingers on a single hand.

The situation is quite different on a pen computer or a computer utilizing a touch screen and also on miniature keyboards found in many personal digital assistants. In these situations, input is performed with a single finger, or with an electronic pen or some equivalent device. The same finger, or other input device, must travel to successive keys one by one which requires considerable finger (or pen) travel.

Clearly, the adoption of the QWERTY layout, or other layouts optimized for multiple finger input, for such on-screen keyboards is very inefficient and is only the outcome of an extrapolation of such keyboards to a context where the premises are quite different. In addition to the issue of pen travel, there is the additional fact that an on-screen keyboard will always require that a user look at the keys on the keyboard which is unlike the practice of touch-typists on a ten-finger keyboard. The ten-finger knowledge of a keyboard does not translate necessarily into a knowledge of where to look for each consecutive key, and this observation has sometimes led to the adoption of a purely alphabetical keyboard for certain systems. However, alphabetical keyboards do not result in lesser pen or finger travel.

SUMMARY OF THE INVENTION

The object of the present invention is to provide keyboards that are optimized to reduce pen travel and finger travel.

It is a further object of the present invention to provide a keyboard layout optimizing travel distance around a plurality of center keys.

A keyboard of the present invention includes a plurality of keys wherein the keys corresponding to the most commonly used characters in the target language are generally positioned in a center area. The keys corresponding to the most common characters in the target language are further arranged according to the frequency of transitions between the characters such that keys which are most frequently used in conjunction with each other are located in adjacent locations. A keyboard of the present invention provides a layout in which there is a reduction in the distance of travel required of a single point data entry vehicle, such as a pen or a finger or a cursor controlled by a mouse, in entering data in a target language. For a preferred embodiment of the present invention, a greater than four-fold reduction in hand movements can result relative to the use of a QWERTY keyboard when using a single point data entry vehicle. Thus, a keyboard of the present invention maximizes the efficiency of entering characters with a single point entry vehicle such as a pen or a finger.

BRIEF DESCRIPTION OF THE DRAWINGS

For a more complete understanding of the present invention, reference is made to the following Detailed Description taken in conjunction with the accompanying drawings in which:

FIGS. 1A and 1B are a preferred embodiment of a keyboard incorporating the present invention;

FIG. 2 is a schematic illustration of a preferred embodiment of the present invention illustrated in conjunction with the frequencies of letters in the English language (in occurrences of 10,000 letters); and FIGS. 3–5 are illustrations of a preferred embodiment of the present invention in which various groups of the characters are highlighted.

DETAILED DESCRIPTION

Preferred embodiments of the present invention will now be described with continued reference to the drawings.

A preferred embodiment of the present invention is shown in FIGS. 1A and 1B. A first characteristic of preferred embodiment of the present invention is that the keyboard has a generally square form adopted for the alphabetical portion of the keyboard. Assuming a starting position of the pen (or single finger) at the center, this will result in small travels to the other keys. (The following description is provided in terms of pen travel, with the understanding that the same considerations and the same results apply to finger travel on a miniature keyboard on a touch-screen and other single point entry vehicles).

Key placement on the keyboard illustrated in FIGS. 1A and 1B is conditioned by frequencies of characters (letters and other symbols such as the space character, ".", ";", ":", ",", "<", ">") in the English language These are indicated for each letter (in occurrences per 10,000 letters) in FIG. 2, based on the Brown Corpus for the English language. The most frequent character is by far the space character, with a frequency of 17.4%. To account for this fact, two large space keys are provided in this preferred embodiment of the present invention. This has the effect of minimizing the distance of any letter key to a space key to either one or two key locations (that is, adjacent or one key away).

Figures 4, 5:
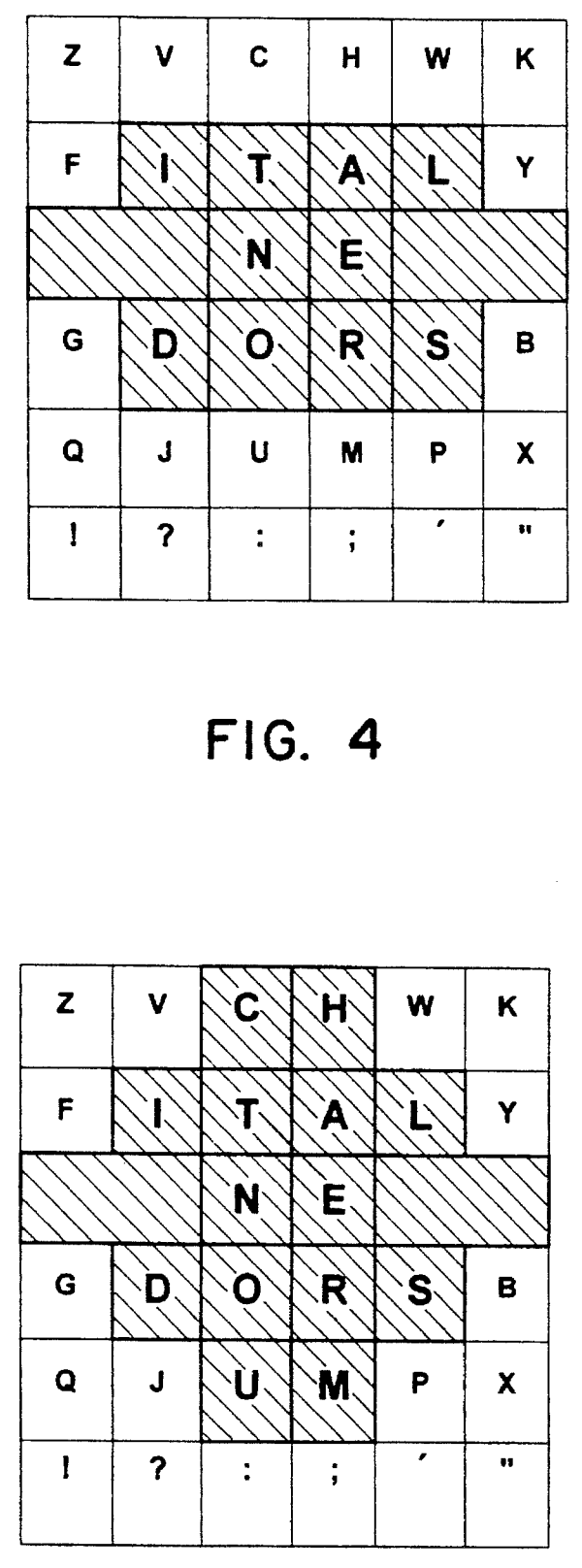

As shown in FIGS. 3, 4, and 5, the most frequent letters are quite closely grouped:

The six characters of the shaded area of FIG. 3 "taneor" represent a combined frequency of 39.9% and, together with the space keys, of 56.7%. Thus, more than half of all keystrokes are likely to occur in the shaded area of FIG. 3.

The ten characters of the shaded area of FIG. 4 "italnedors" and the space keys represent a combined frequency of use of 73.4%. Thus, almost three-quarter of all keystrokes are likely to occur in the shaded area.

Finally, the shaded area of FIG. 5, with the addition of the pairs of characters "ch" and "um", brings the combined frequency of use in the Brown Corpus to 83.8% of all keystrokes.

In the preferred embodiment illustrated above, the use of the illustrated key placements means that half of the key strokes are likely to occur within one position from the center keys "n" and "e", and 83.8% of all key strokes will occur within two positions. In comparison, these distances range up to 5 keys away from the center keys on the QWERTY keyboard. Similarly, the maximum distance between two characters is 5 ("Z"–"X") in the keyboard shown in FIG. 1, compared to a distance of ("A"–"P") on the QWERTY keyboard.

The difference in required travel for a single-entry vehicle or vehicle as the case may be, is most significant on the six center characters "taneor"; on a keyboard shown in FIG. 1, the longest travel between any two keys is 2, compared to 8 for "A"–"O" on the QWERTY keyboard.

The preferred embodiment of the present invention is illustrated in FIGS. 1–5, wherein high frequency keys have been placed near the center of the keyboard and double oversized space keys are provided, is further optimized in accordance with the following method pertaining to character transitions:

First, a two dimensional table is obtained counting the number of occurrences of character transitions, for example, how many occurrences of the character "o" followed by the character "a". This is done on a representative corpus of text. Such a corpus will typically involve several hundred thousand characters and provide a good estimation of the frequency of use and frequency of transition between specific characters which occur in the target language.

Then for a given keyboard layout, the distance between any two keys is computed. For simplicity, this is defined as the maximum of the vertical and horizontal distances of the two keys.

Thus, for example, the distance between "0" and "A" on FIGS. 1A and 1B is defined as 2 since the vertical distance is equal to 2 and the horizontal distance is 1. (In an alternative embodiment, distance is computed on an actual physical distance between the center portions of the keys).

The average travel for this corpus and for the keyboard considered is then obtained by evaluating the key to key distance weighed by the corresponding frequency of the key to key transitions for the target language.

Finally, key permutations are done until the average travel of the single point entry vehicle cannot be significantly improved based on the results of the representative corpus of text. For example, a difference of a few percent (usually less than 10%, and in a preferred embodiment less than 2%) will not be considered significant since it is of the same order of magnitude as what is found with texts on different subjects.

When applying the above method, one may start with some arbitrary layout and then perform the optimization. The end result usually depends on the initial layout although the efficiency of the resulting optimized keyboard is relatively independent of the starting point. In other words, whereas the method achieves very significant reduction in finger travel and hand movements over a QWERTY keyboard layout, there are a number of optimized layouts which are within one or two percent of each other. Consequently, a designer may start from one of these optimize layouts and may consider other factors such as existing user preferences or mnemonic considerations as long as the resulting efficiency is not decreased by more than one or two percent. Thus, user preferences may dictate the final design of the keyboard beyond the efficiency parameters provided by the representative corpus of text as discussed above. For example, the preferred embodiment illustrated in FIG. 1A and 1B was selected among optimal keyboards because it offers easy to remember sequences, i.e., mnemonic representations, such as "FITALY", "DOORS", and "JUMP".

A mnemonic advantage comes as a consequence of having optimized key-to-key transitions in accordance with the above method: The key to be typed after a selected key is very likely to be a key adjacent to the previous selected key. Therefore users who are just beginning to use this keyboard will find keys to be easy to find since they do not have to look far from the current key.

For the preferred embodiment shown in FIGS. 1–5, an average key travel of 1.9 (defined as above) is obtained, compared to an average travel of 3.2 for the QWERTY layout. For prose, involving few numbers and symbols, the results are even better. For example, tying the word "paper" on the QWERTY will result in a total travel of 26, compared to just 9 on the keyboard shown in FIGS. 1A and 1B.

While this reduction in key travel is a significant achievement, the above described method achieves even more far ranging improvements in the reduction of hand movements.

While using a pen, small movements of the pen are made using only flexions of the two fingers holding the pen, while the rest of the hand remains substantially immobile, with the little finger rested on the screen. Larger key travels will involve the hand (the little finger) sliding on the screen. In practice, and as used herein, horizontal travel of up to 2 keys and vertical up to 3 keys do not involve any full hand movement.

The automatic analysis of hand movements (wherein a hand movement is as defined above), based on similar corpus of text as described above shows a reduction of hand movements by a factor of at least 3 relative to the QWERTY keyboard. Typically, in the preferred embodiment shown in FIGS. 1–5, a hand movement is only required, on average, every fourth keystroke.

The preferred embodiment shown in FIG. 1A and 1B, is for the English language. A similar process can be applied to produce keyboards optimizing pen travel for other languages.

In summary, the preferred method involves the selection of an almost square shape (6×5) for the alphabetical characters, preferably with two large space keys. Characters are then initially placed on the keyboard with most frequent characters in the center and less frequent characters at the periphery. Then average travel is evaluated for a representative corpus of text, and permutations of characters are done until the average travel can no longer be improved. The resulting keyboard is then checked for hand movements.

The Pascal program appended to this patent application can be used to evaluate and optimize keyboard layout for average travel and hand movements. This program contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever. The program is written in an object oriented extension of Pascal available through Borland.

When several alternative keyboards offer comparable average travel and hand movements, the choice can be made on the basis of other considerations such as the ease of remembering a given configuration.

It is understood that various other modifications will be apparent to and can be readily made by those skilled in the art without departing from the scope and spirit of the present invention. For instance, the representative corpus may be based on a plurality of languages, thereby creating a universally optimized keyboard. Additionally, the same concepts could be applied to keys having non-square configurations, i.e., hexagonal and the distance between keys may be computed using actual distance rather than key displacements as set forth above. Similarly, the present may be applied equally for both hardware embodiments of the keyboard and on-screen representations of the keyboard. Accordingly, it is not intended that the scope of the claims be limited to the description or illustrations set forth herein, but rather that the claims be construed as encompassing all features of patentable novelty that reside in the present invention, including all features that would be treated as equivalents by those skilled in the art.

What is claimed is:

1. A method for designing a keyboard layout and assigning a plurality of characters in a target language to a keyboard for efficient entry of data using a single data entry vehicle, said keyboard comprising a plurality of keys including at least one key for each of said plurality of characters in said target language wherein the keys are arranged and disposed in a simple geometric formation, said formation defining a distance between every pair of said keys and said keys further arranged in accordance with the method comprising the steps:

(a) calculating a frequency of use for each of said plurality of characters from a representative corpus of text for said target language;

(b) calculating a frequency of transitions between each pair of characters in said plurality of characters from said representative corpus of text for said target language;

(c) defining a geometry for the keys of the keyboard and calculating the corresponding distance between every pair of keys in said keyboard;

(d) defining a current assignment for the plurality of characters to at least one of the keys on the keyboard and computing an average distance of travel for the single data entry vehicle by weighing the corresponding distance between every pair of said keys assignment by the frequency of transition between the corresponding characters for the assigned keys according to the current assignment;

(e) defining an alternative assignment obtained by permutation of the plurality of characters on said keys and replacing the current assignment by the alternative assignment if the average distance of travel for the alternative assignment is less than that for the current assignment;

(f) repeating step (e) for all permutations of the plurality of characters.

2. The method of claim 1, further comprising the step of repeating steps (c) through (f) for a plurality of alternative keyboard geometries.

3. The method of claim 1, wherein step (e) is a permutation of two characters and step (f) consists of all two character permutations.

4. The method of claim 1 wherein step (e) is a permutation of n characters, wherein n greater than 2.

5. The method of claim 1 wherein step (f) ends when permutations fail to provide a reduction in the average distance of travel of less than one per cent.

6. The method of claim 1 wherein the target language comprises at least two languages.

7. The method of claim 1 wherein the representative corpus of text includes at least several hundred thousand characters.

8. A keyboard for efficient entry of data in a target language using a single data entry vehicle having a plurality of keys corresponding to a plurality of characters in said target language, wherein the plurality of characters are assigned to the plurality of keys in accordance with the method of claim 1.

9. The keyboard of claim 8 wherein the characters are further arranged on said plurality of keys to include at least one sequence of characters constituting a mnemonic representation in said target language, and said further configuration of characters on said plurality of keys does not change the average distance of travel for the representative corpus of text by more than 10%.

10. The keyboard or claim 8, wherein the plurality of keys are generally arranged in a six column by five row arrangement and the keys are positioned to provide the following arrangement for the plurality of characters:

| Z | V | C | H | W | K |
|---|---|---|---|---|---|
| F | I | T | A | L | Y |
|   |   | N | E |   |   |
| G | D | O | R | S | B |
| Q | J | U | M | P | X. |

11. The keyboard of claim 8 wherein the keyboard is further provided with at least one double size character key for assignment to one of the plurality of characters having the greatest frequency of use.

12. The keyboard of claim 11, wherein the double sized key is assigned to a space character.

* * * * *